United States Patent [19]

Inoue

[11] Patent Number: 4,637,650
[45] Date of Patent: Jan. 20, 1987

[54] TOP COVER MEMBER FIXING ARRANGEMENT IN A VEHICLE SEAT

[75] Inventor: Nobuhiro Inoue, Tokyo, Japan

[73] Assignee: Tachikawa Spring Co., Ltd., Japan

[21] Appl. No.: 686,233

[22] Filed: Dec. 26, 1984

[30] Foreign Application Priority Data

Dec. 27, 1983 [JP] Japan .......................... 58-199849[U]

[51] Int. Cl.⁴ .............................................. A47C 1/10
[52] U.S. Cl. ..................................... 297/410; 297/379
[58] Field of Search ............... 297/452, 410, 379, 378, 297/194; 5/468; 112/137

[56] References Cited

U.S. PATENT DOCUMENTS

| 3,063,751 | 11/1962 | Hatch | 297/410 |
| 3,511,535 | 5/1970 | Gunlock | 297/410 |
| 3,904,241 | 9/1975 | Makinen | 297/410 X |
| 4,068,890 | 1/1978 | Kurozu et al. | 297/379 |
| 4,478,456 | 10/1984 | Mitsui | 297/410 |

FOREIGN PATENT DOCUMENTS 2453732 5/1976 Fed. Rep. of Germany ...... 297/379

Primary Examiner—Peter A. Aschenbrenner
Attorney, Agent, or Firm—Darby & Darby

[57] ABSTRACT

The present invention relates to a fixed structure of the cut edges of a top layer member of a seat for vehicles. At the edges therefrom a band piece with a latching portion is secured to the front end thereof and said band piece mounted on the top layer member is arranged not to come off by holding same between a flame member within a seat and a holding member.

4 Claims, 7 Drawing Figures

TOP COVER MEMBER FIXING ARRANGEMENT IN A VEHICLE SEAT

FIELD OF THE INVENTION

The present invention relates to a fixed structure of a top layer member of a seat for vehicles providing with a fitting portion such as a head rest.

DISCLOSURE OF THE PRIOR ARTS

In order to fix a head rest or a locking device etc. to a seat back, it is necessary to form a through hole or a concave portion at a prescribed position of a seat back. For this reason, it is required that the top layer member corresponding to the above portion or hole is cut and further the edges of the cut portion must be fixed to the seat back from turning over therefrom.

As a conventional method thereof, as shown in FIG. 1, the edges of the top layer member thus cut are clamped by means of a screw (11) (11) by pressing down the edges thereof by a metallic pressing piece (10). According to the above conventional method, the edges of the top layer member (12) are apt to turn over enough to expose same outside owing to a wide clamping distance by means of the screw as shown in the Figure, which impairs the sense of beauty. On the other hand, it is possible to remove the above-mentioned defect by narrowing the clamping distance of the screw (11) (11); however, at that time, a number of screws are inevitably required, resulting in a poor operationability. It is also possible to employ a hook instead of the screw. When the hook is employed, an appearance becomes bad because it can be observed from the outside, the method of which has not seldom been employed.

BACKGROUND OF THE INVENTION

An object of the present invention is to simplify and beautify the edges of a top layer member of a cut portion thereof and further to fix same to a seat back without fail.

In order to fulfill the above-mentioned object, according to the present invention, it is such constituted that a band piece with a latching projection at the front edge thereof is fixed to the end of a top layer member and said band piece is held between a frame member within the seat and a holding member. Accordingly, the band piece is firmly latched by means of the latching projection and therefore the band piece mounted on the top layer member does not come off even if the holding member is secured to the frame member with a wide distace.

Said band piece made of a soft synthetic resin is formed flexibly in its longitudinal direction. For this reason, the end of the top layer member may apply along the notch portion of the seat.

The notch portion of the seat to which the edges of said top layer member is secured, is formed at a top of the seat back in order to insert the locking device for securing the seat back in a wall face of a car body or insert a stay of the head rest into the seat back.

The holding member for holding the band piece therebetween is a wire, a metallic plate or a hard synthetic resin plate mounted along the edges of the notched portion. Said holding member is secured to the frame member by means of a screw. At the time of securing same, the band piece is held therebetween. Regarding with said holding member, a guide tube for inserting a stay may be employed when a metal or hard synthetic resin plate hemming the outer periphery of the notch portion or the notch portion itself is allowed to insert the stay of the head rest.

BRIEF DESCRIPTIONS OF THE DRAWINGS

In the Figures,

FIG. 2 is a partially enlarged perspective view thereof.

FIG. 3 is a front view partially cut thereof.

FIG. 4 is a longitudinal section view taken along line X—X.

FIG. 5 is a perspective view showing a fitting condition of a holding member.

FIG. 6 is a perspective view of the end portion of a top layer member, and

FIG. 7 is a perspective view of another embodiment according to the present invention.

DETAILED DESCRIPTION OF THE PREFERRED EMBODIMENTS

Hereinafter, embodiment according to the present invention will be described with reference to FIG. 2 to FIG. 7. In the Figures, (A) is a notch portion for fixing parts thereto notched one portion of a seat covered with a tap layer member. (4) is a frame member made of a hard material secured to the edges of the notch portion (A). (2) is a top layer member for securing the end thereof along the frame member (4). (5) is a holding member.

Figure 1:
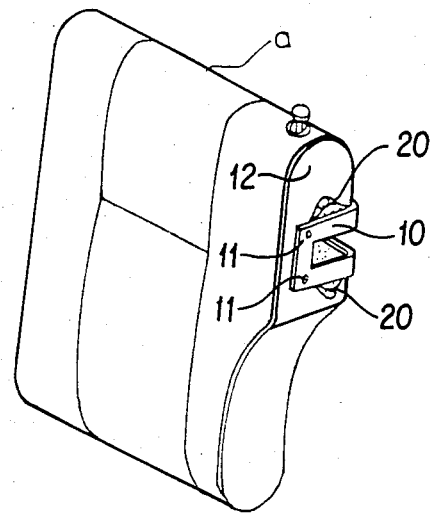
FIG. 1 is a perspective view of a conventional product.
Figure 2:
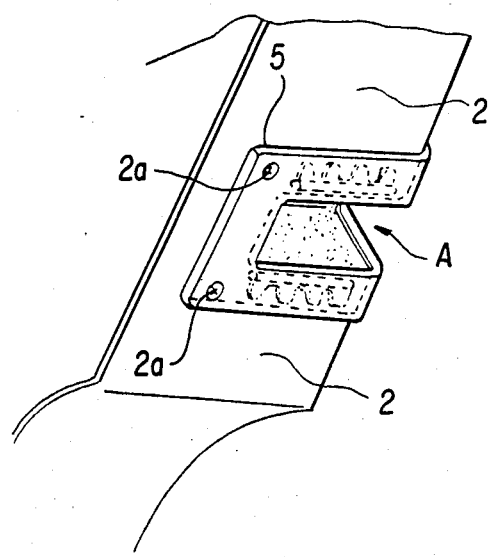
FIG. 2 to FIG. 7 are a product according to the present invention.

The illustrated notch portion (A) is employed for fixing a locking device (not illustrated) and the locking device is mounted as shown in FIG. 1 on the wall face of a car body of the seat back (a) so as to adjust an inclination degree of the seat back (a) and further to prevent falling backward thereof.

The frame member (4) made of a hard material such as a frame line is secured to the notch projection (A) and a screw fixing portion is also arranged at the end thereof. In the Figures, (6) is a cushioning member such as a foaming agent.

Figure 6:
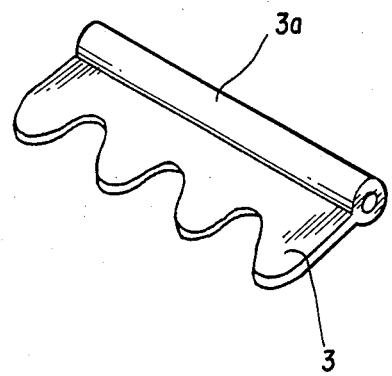

As shown in FIG. 6, a band piece (3) is shewn into the end of the notch portion (A) of the top layer member (2) covering the cushioning member (6). The band piece (3) is made of a soft synthetic resin and a latching projection (3a) is uniformely formed along the front edge thereof. The base portion thereof is formed in the shape of wave to be easily bent in the longitudinal direction thereof. The illustrated latching projection (3a) provides with a round projection at the front end of the band piece (3). This is not limited to the illustrated one provided that it is thicker than that of the band piece (3). For example, it is possible to project same independently along the front edge of the band piece (3).

Figure 5:
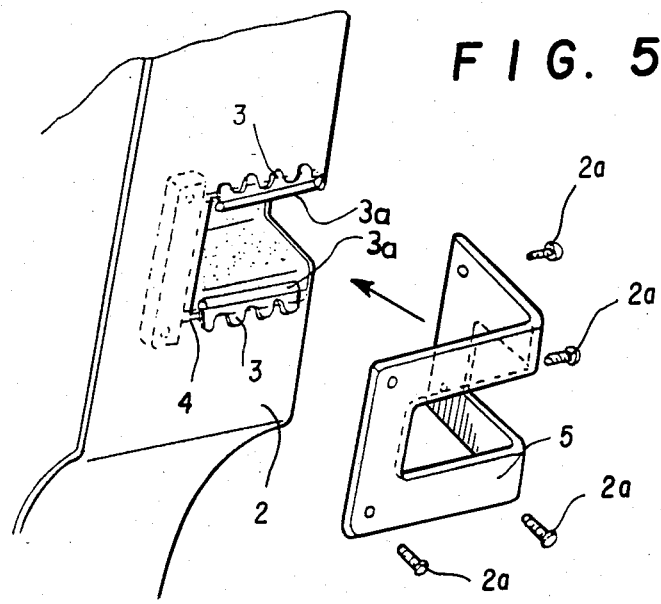

The band piece (3) is sewn into the edges of the top layer member (2) in such that the latching projection (3a) is positioned within said frame member (4). (FIG. 5)

Figure 3:
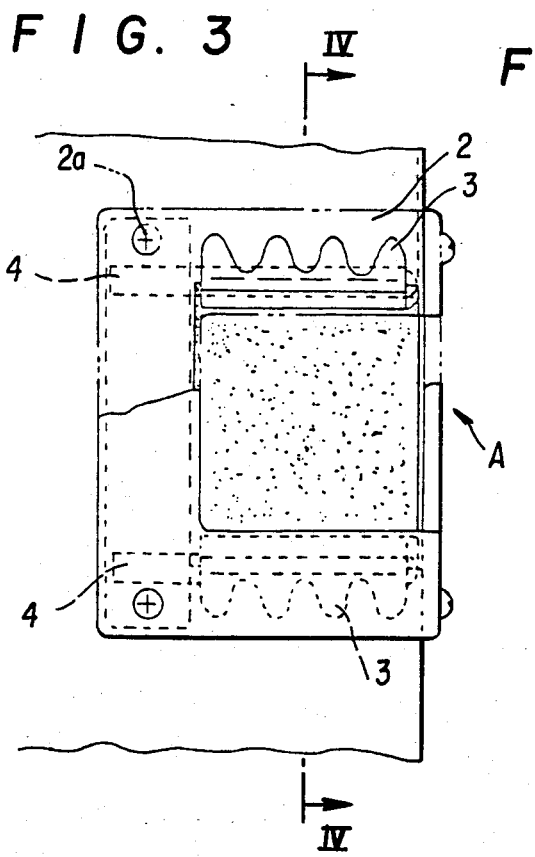
Figure 4:
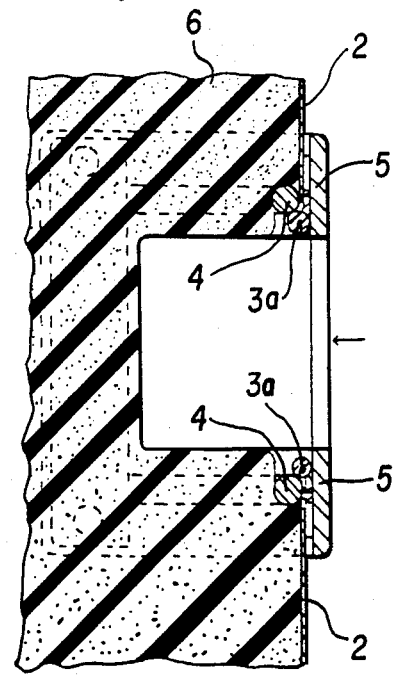

The holding member (5) made of a metal or a hard synthetic resin hemming the edges of said notch portion (A) is secured to the fixing portion of said frame member (4) by means of a screw. At the time of securing same, the band piece (3) is secured by means of the holding member (5) in such that the latching projection (3a) thereof is positioned within the frame member (4). (FIG. 3 and FIG. 4)

Figure 7:
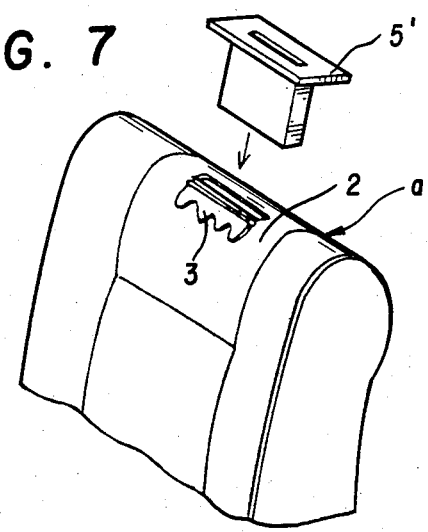

FIG. 7 shows the case where the structure according to the present invention is employed for the fitting portion of a head rest; and a holding member (5') at that time is a guide tube for inserting a stay of the head rest. At the end of the top layer member, the band piece (3) with a latching projection is mounted at the front end thereof as the same with the above-mentioned embodiment.

According to the present invention, it is possible to secure the top layer member by sewing a band piece into the top layer member and further holding same between a frame member and a holding member; and, after securing same, the band piece is firmly latched by means of a latching projection thereof. Accordingly, the edges of the top layer member are easily secured to a seat back compared with that of a conventional method and further gives an excellent appearance because the secured portion cannot be observed from the outside.

Furthermore, the secured portion is not exposed by turning over therefrom.

What we claimed is:

1. In a vehicle seat having a top cover, the top cover having a cut-out formed therein and having an edge portion surrounding the cut-out, apparatus for securing the top cover edge portion surrounding the cut-out, the apparatus comprising:
   a frame member, the frame member having a body formed as one of a plate and a wire, the frame member having a shape which conforms to the shape of the cut-out, the frame member being disposed adjacent to the top cover edge portion surrounding the cut-out;
   a plate-like piece, the piece including a plate-like base portion and a protruding portion joined to and protruding from the base portion, the protruding portion having a thickness which is greater than that of the base portion, the plate-like piece being mounted on the top cover adjacent to the cut-out, the base portion being secured to the top cover edge portion surrounding the cut-out, the frame member and the plate-like piece being positioned relative to each other such that the protruding portion of the piece is more closely disposed to the cut-out than the frame member; and
   a holding member, the holding member being formed as a rim positioned adjacent to and surrounding the cut-out, the plate-like piece being interposed between the frame member and the holding piece and being securely held therebetween, thereby securing the edge portion of the top cover.

2. Apparatus as defined by claim 1, wherein the base portion of the plate-like piece is sewn to the edge portion of the top cover; and wherein the base portion of the plate-like piece is formed in a sinuous shape.

3. Apparatus as defined by claim 1, wherein said holding member is made from one of a metallic material and a hard synthetic resin plate; and wherein the holding member is secured to the frame member by means of screws.

4. Apparatus as defined by claim 1, wherein holding member is a guide member adapted for insertion of a head rest stay therethrough.

* * * * *